United States Patent
Ding et al.

(10) Patent No.: US 10,917,300 B2
(45) Date of Patent: Feb. 9, 2021

(54) METHOD FOR OBTAINING STANDARD CONFIGURATION TEMPLATE OF NETWORK DEVICE, AND COMPUTING DEVICE

(71) Applicant: Huawei Technologies Co., Ltd., Shenzhen (CN)

(72) Inventors: Lv Ding, Nanjing (CN); Kang Cheng, Nanjing (CN); Jian Li, Shenzhen (CN); Jianfeng Wang, Nanjing (CN); Xiaoping Ma, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 249 days.

(21) Appl. No.: 16/694,160

(22) Filed: Nov. 25, 2019

(65) Prior Publication Data

US 2020/0092169 A1    Mar. 19, 2020

Related U.S. Application Data

(63) Continuation of application No. PCT/CN2018/084896, filed on Apr. 27, 2018.

(30) Foreign Application Priority Data

May 26, 2017 (CN) .......................... 2017 1 0386893

(51) Int. Cl.
    *H04L 12/24* (2006.01)
(52) U.S. Cl.
    CPC ...... *H04L 41/0843* (2013.01); *H04L 41/0853* (2013.01); *H04L 41/0893* (2013.01)

(58) Field of Classification Search
    CPC ............ H04L 41/0843; H04L 41/0853; H04L 41/0893; H04L 41/02; H04L 43/0817; H04L 43/00; G06K 9/62
    See application file for complete search history.

(56) References Cited

U.S. PATENT DOCUMENTS

| | | | | |
|---|---|---|---|---|
| 7,395,322 | B2 * | 7/2008 | Harvey | H04L 67/303 |
| | | | | 709/203 |
| 8,041,786 | B2 * | 10/2011 | Tindal | H04L 43/00 |
| | | | | 709/220 |

(Continued)

FOREIGN PATENT DOCUMENTS

| | | |
|---|---|---|
| CN | 105512267 A | 4/2016 |
| CN | 105847065 A | 8/2016 |

(Continued)

*Primary Examiner* — Abdullahi E Salad
(74) *Attorney, Agent, or Firm* — Conley Rose, P.C.

(57) ABSTRACT

A method for obtaining a standard configuration template of a network device and a computing device includes obtaining configuration commands of a plurality of network devices, erating a command template set including a plurality of different command templates, generating a correlation matrix based on the command template set, clustering the plurality of network devices based on the correlation matrix to obtain at least two categories of network devices, dividing the correlation matrix into a plurality of submatrixes based on a clustering result, performing singular value decomposition on each submatrix to obtain a non-zero singular value, and using, as a standard configuration template of a corresponding category, a command template in the command template set that makes a contribution greater than a threshold to the non-zero singular value.

20 Claims, 7 Drawing Sheets

(56) References Cited

U.S. PATENT DOCUMENTS

| | | | |
|---|---|---|---|
| 8,255,405 B2 | 8/2012 | Basu et al. | |
| 8,782,182 B2* | 7/2014 | Chaturvedi | H04L 41/0853 709/221 |
| 2004/0017585 A1* | 1/2004 | Makishima | G06F 21/608 358/1.18 |
| 2006/0031434 A1* | 2/2006 | Tindal | H04L 41/0266 709/220 |
| 2011/0317553 A1 | 12/2011 | Dinan et al. | |
| 2014/0095677 A1* | 4/2014 | Croy | H04L 41/16 709/220 |
| 2015/0280987 A1* | 10/2015 | Yasuda | H04L 41/0803 709/220 |
| 2016/0006633 A1 | 1/2016 | Kimura et al. | |

FOREIGN PATENT DOCUMENTS

| | | |
|---|---|---|
| CN | 106708969 A | 5/2017 |
| EP | 3076599 A1 | 10/2016 |
| WO | 2016028574 A1 | 2/2016 |

\* cited by examiner

```

ip vpn-instance _LOCAL_OAM_VPN_
  ipv4-family

ip dcn vpn-instance _dcn_vpn_
  ipv4-family

ip vpn-instance _LOCAL_OAM_VPN2_
  ipv4-family

```

FIG. 3

```

ip vpn-instance
  ipv4-family

ip dcn vpn-instance
  ipv4-family

ip vpn-instance
  ipv4-family

```

FIG. 4

```

ip vpn-instance ipv4-family

ip dcn vpn-instance ipv4-family

ip vpn-instance ipv4-family

```

FIG. 5

CONT. FROM FIG. 6A ⇨

602

| First category of devices | Command template 1 | Command template 2 | ... | Command template m |
|---|---|---|---|---|
| Network device 1 | $w_{11}$ | $w_{12}$ | ... | $w_{1m}$ |
| Network device 2 | $w_{21}$ | $w_{22}$ | ... | $w_{2m}$ |
| Network device 4 | $w_{41}$ | $w_{42}$ | ... | $w_{4m}$ |
| Network device 5 | $w_{51}$ | $w_{52}$ | ... | $w_{5m}$ |

CONT. FROM FIG. 6A ⇨

603

| Second category of devices | Command template 1 | Command template 2 | ... | Command template m |
|---|---|---|---|---|
| Network device 3 | $w_{31}$ | $w_{32}$ | ... | $w_{3m}$ |
| Network device 6 | $w_{61}$ | $w_{62}$ | ... | $w_{6m}$ |
| Network device 7 | $w_{71}$ | $w_{72}$ | ... | $w_{7m}$ |

FIG. 6B

METHOD FOR OBTAINING STANDARD CONFIGURATION TEMPLATE OF NETWORK DEVICE, AND COMPUTING DEVICE

CROSS-REFERENCE TO RELATED APPLICATIONS

This application is a continuation application of International Application No. PCT/CN2018/084896, filed on Apr. 27, 2018, which claims priority to Chinese Patent Application No. 201710386893.1, filed on May 26, 2017. The disclosures of the aforementioned applications are hereby incorporated by reference in their entireties.

TECHNICAL FIELD

This application relates to the communications field, and in particular, to a method for obtaining a standard configuration template of a network device, and a computing device.

BACKGROUND

In a network device configuration check, a current configuration on a network device is matched with a standard configuration. In a matching process, information that the current configuration on the network device is inconsistent with the standard configuration is used as an alarm for a prompt, and then processed by an expert.

In the foregoing configuration check manner, a standard configuration of each network device needs to be stored, and a large quantity of storage resources are occupied.

SUMMARY

This application provides a method for obtaining a standard configuration template of a network device, and a computing device, to reduce storage resource usage.

According to a first aspect, a method for obtaining a standard configuration template of a network device is provided. The method includes obtaining, by a computing device, configuration commands of a plurality of network devices, and generating a command template set according to the configuration commands of the plurality of network devices, where the command template set includes a plurality of command templates; generating, by the computing device, a correlation matrix based on the command template set, where the correlation matrix includes a plurality of correlation values, and each correlation value indicates a correlation between one command template in the command template set and one of the plurality of network devices; clustering, by the computing device, the plurality of network devices based on the correlation matrix to obtain at least two categories of network devices, and dividing the correlation matrix into a plurality of submatrixes based on a clustering result, where each submatrix corresponds to one of the at least two categories of network devices, and a correlation value in each submatrix indicates a correlation between a command template in the command template set and a network device of the corresponding category; and performing, by the computing device, singular value decomposition on each submatrix to obtain a non-zero singular value, and using, as a standard configuration template of the corresponding category, a command template that is in the command template set and that makes a contribution greater than a threshold to the non-zero singular value.

According to the foregoing solution, a standard configuration template is generated for each category, thereby avoiding storing, for each device, a standard configuration used for a configuration check, and reducing storage resource consumption.

Optionally, the computing device obtains a configuration command of a to-be-detected network device, generates a command template of the to-be-detected network device according to the configuration command of the to-be-detected network device, matches the command template of the to-be-detected network device with a standard configuration template of a category to which the to-be-detected network device belongs, and outputs an error prompt based on a matching result.

Optionally, the computing device determines, according to the configuration command of the to-be-detected network device and a standard configuration template of each category, the category to which the to-be-detected network device belongs.

Optionally, the to-be-detected network device is one of the plurality of network devices, and the computing device determines, based on the clustering result, the category to which the to-be-detected network device belongs.

Optionally, the computing device deletes parameters in the configuration commands to obtain the plurality of command templates. The parameters in the configuration commands are deleted such that a subsequently generated standard configuration template includes no parameter. Therefore, matching is easier in a configuration check performed based on the standard configuration template, and applicability is better.

Optionally, the correlation matrix is an n×m matrix, n is a quantity of the plurality of network devices, and m is a quantity of the command templates in the command template set; and a calculation formula of the correlation value is $$w_{ij} = tf_{ij} \times \log\frac{n}{df_j} \times \delta_j,$$

where $w_{ij}$ represents a correlation value in an $i^{th}$ row and a $j^{th}$ column in the correlation matrix, $tf_{ij}$ represents a quantity of $j^{th}$ command templates in the command template set that are included in an $i^{th}$ network device, $df_j$ represents a quantity of network devices that are in the plurality of network devices and that include the $j^{th}$ command template, and $\delta_j$ represents a weight of the $j^{th}$ command template. In the foregoing solution, a weight of a command template is set such that accuracy and applicability of the clustering result can be improved.

Optionally, a calculation formula of the singular value decomposition is $M=U\Sigma V^*$, where M represents a submatrix on which the singular value decomposition is performed, U represents an s×s unitary matrix, s is a quantity of network devices of a category corresponding to the submatrix M, $\Sigma$ represents a positive semi-definite s×m rectangular diagonal matrix, non-zero singular values in $\Sigma$ are arranged in descending order along a diagonal starting from a first row, V* represents an m×m unitary matrix, and V* is a conjugate transpose matrix of V; and a calculation formula of the contribution is $$\rho_j = \frac{\sum_{p=1}^{k} U_p M_j V_{jp}}{\sum_{p=1}^{k} \lambda_p},$$

where $\rho_j$ represents a contribution of the $j^{th}$ command template in the command template set, $U_p$ represents a $p^{th}$ row vector in U, $M_j$ represents a $j^{th}$ column vector in M, $V_{jp}$ represents an element in a $j^{th}$ row and a $p^{th}$ column in V, k is a quantity of the non-zero singular values in Σ, and $\lambda_p$ represents a $p^{th}$ non-zero singular value of the non-zero singular values in Σ that is counted to in descending order. The contribution calculated using the foregoing calculation formula has a fixed value range of 0 to 1, and a same threshold (a value range of the threshold is 0 to 1) may be set for all categories, to simply complete threshold setting.

According to a second aspect, a computing device is provided. The computing device includes an obtaining unit and a processing unit.

The obtaining unit is configured to obtain configuration commands of a plurality of network devices.

The processing unit is configured to generate a command template set according to the configuration commands of the plurality of network devices, and generate a correlation matrix based on the command template set. The command template set includes a plurality of command templates, the correlation matrix includes a plurality of correlation values, and each correlation value indicates a correlation between one command template in the command template set and one of the plurality of network devices.

The processing unit is further configured to cluster the plurality of network devices based on the correlation matrix to obtain at least two categories of network devices, and divide the correlation matrix into a plurality of submatrixes based on a clustering result. Each submatrix corresponds to one of the at least two categories of network devices, and a correlation value in each submatrix indicates a correlation between a command template in the command template set and a network device of the corresponding category.

The processing unit is further configured to perform singular value decomposition on each submatrix to obtain a non-zero singular value, and use, as a standard configuration template of the corresponding category, a command template that is in the command template set and that makes a contribution greater than a threshold to the non-zero singular value.

Optionally, the obtaining unit is further configured to obtain a configuration command of a to-be-detected network device; and the processing unit is further configured to generate a command template of the to-be-detected network device according to the configuration command of the to-be-detected network device, match the command template of the to-be-detected network device with a standard configuration template of a category to which the to-be-detected network device belongs, and output an error prompt based on a matching result.

Optionally, the processing unit determines, according to the configuration command of the to-be-detected network device and a standard configuration template of each category, the category to which the to-be-detected network device belongs.

Optionally, the to-be-detected network device is one of the plurality of network devices, and the processing unit determines, based on the clustering result, the category to which the to-be-detected network device belongs.

Optionally, the processing unit deletes parameters in the configuration commands to obtain the plurality of command templates. The parameters in the configuration commands are deleted such that a subsequently generated standard configuration template includes no parameter. Therefore, matching is easier in a configuration check performed based on the standard configuration template, and applicability is better.

Optionally, the correlation matrix is an n×m matrix, n is a quantity of the plurality of network devices, and m is a quantity of the command templates in the command template set; and a calculation formula of the correlation value is the calculation formula of the correlation value in the first aspect.

Optionally, a calculation formula of the singular value decomposition and a calculation formula of the contribution are respectively the calculation formula of the singular value decomposition and the calculation formula of the contribution in the first aspect.

According to a third aspect, a computing device is provided. The computing device includes a network interface and a processor.

The network interface is configured to obtain configuration commands of a plurality of network devices.

The processor is configured to generate a command template set according to the configuration commands of the plurality of network devices, and generate a correlation matrix based on the command template set. The command template set includes a plurality of command templates, the correlation matrix includes a plurality of correlation values, and each correlation value indicates a correlation between one command template in the command template set and one of the plurality of network devices.

The processor is further configured to cluster the plurality of network devices based on the correlation matrix to obtain at least two categories of network devices, and divide the correlation matrix into a plurality of submatrixes based on a clustering result. Each submatrix corresponds to one of the at least two categories of network devices, and a correlation value in each submatrix indicates a correlation between a command template in the command template set and a network device of the corresponding category.

The processor is further configured to perform singular value decomposition on each submatrix to obtain a non-zero singular value, and use, as a standard configuration template of the corresponding category, a command template that is in the command template set and that makes a contribution greater than a threshold to the non-zero singular value.

Optionally, the network interface is further configured to obtain a configuration command of a to-be-detected network device; and the processor is further configured to generate a command template of the to-be-detected network device according to the configuration command of the to-be-detected network device, match the command template of the to-be-detected network device with a standard configuration template of a category to which the to-be-detected network device belongs, and output an error prompt based on a matching result.

Optionally, the processor determines, according to the configuration command of the to-be-detected network device and a standard configuration template of each category, the category to which the to-be-detected network device belongs.

Optionally, the to-be-detected network device is one of the plurality of network devices, and the processor determines, based on the clustering result, the category to which the to-be-detected network device belongs.

Optionally, the processor deletes parameters in the configuration commands to obtain the plurality of command templates. The parameters in the configuration commands are deleted such that a subsequently generated standard configuration template includes no parameter. Therefore, matching is easier in a configuration check performed based on the standard configuration template, and applicability is better.

Optionally, the correlation matrix is an n×m matrix, n is a quantity of the plurality of network devices, and m is a quantity of the command templates in the command template set; and a calculation formula of the correlation value is the calculation formula of the correlation value in the first aspect.

Optionally, a calculation formula of the singular value decomposition and a calculation formula of the contribution are respectively the calculation formula of the singular value decomposition and the calculation formula of the contribution in the first aspect.

According to a fourth aspect, a computer readable storage medium is provided. The computer-readable storage medium stores an instruction. When the instruction is run on a computer, the computer performs the method in the first aspect as the computing device.

According to a fifth aspect, a computer program product including an instruction is provided. When the instruction is run on a computer, the computer performs the method in the first aspect as the computing device.

BRIEF DESCRIPTION OF DRAWINGS

FIG. 3 is a schematic diagram of a configuration command according to an embodiment of this application;

FIG. 4 is a schematic diagram of a command template in a format according to an embodiment of this application;

FIG. 5 is a schematic diagram of a command template in another format according to an embodiment of this application;

FIG. 6B is a schematic diagram of dividing a correlation matrix according to an embodiment of this application;

DESCRIPTION OF EMBODIMENTS

To make objectives, technical solutions, and advantages of the present disclosure clearer, the following further describes implementations of the present disclosure in detail with reference to the accompanying drawings.

Figure 1:
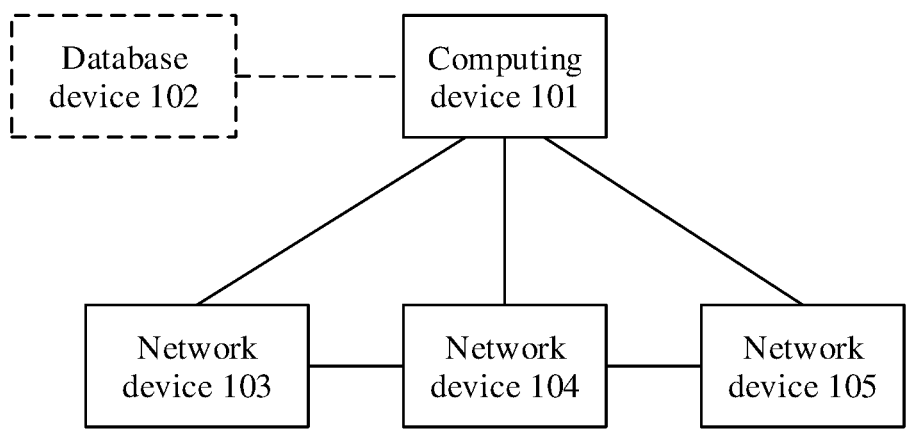
FIG. 1 is a schematic diagram of an application scenario according to an embodiment of this application.

FIG. 1 is a schematic diagram of an application scenario according to an embodiment of this application. A network shown in FIG. 1 includes a plurality of network devices (for example, network devices 103, 104, and 105) and a computing device 101. For example, the network devices 103, 104, and 105 may each be a switch or a router. The computing device 101 may be connected to the network devices in the network, and obtain configuration information of the network devices. The computing device 101 may be, for example, a computer or a mobile terminal. The network may further include a database device 102. The computing device 101 may store data into the database device 102. The database device 102 and the computing device 101 may be a same device, or may be separate devices.

Figure 2:
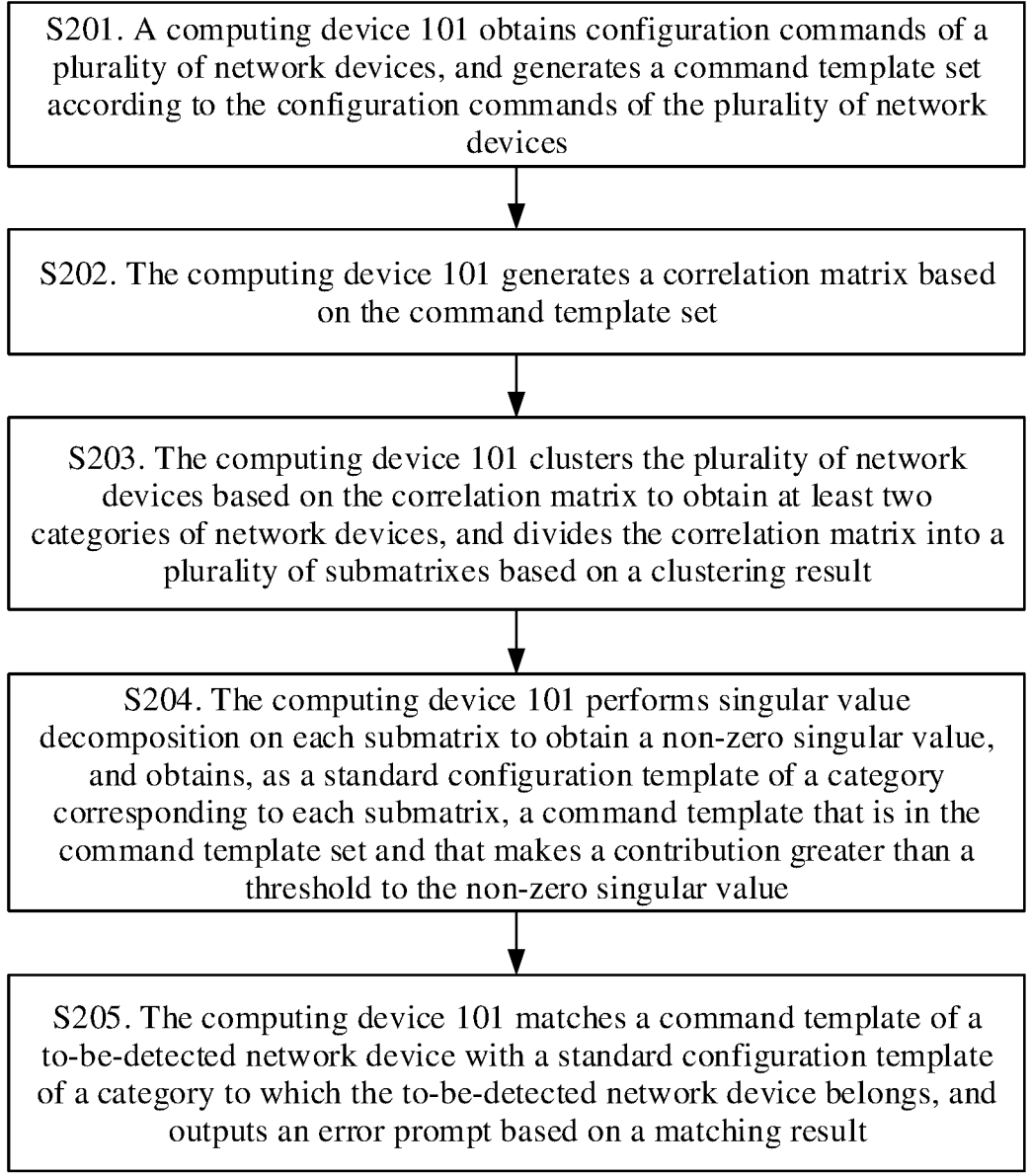
FIG. 2 is a schematic flowchart of a method for obtaining a standard configuration template of a network device according to an embodiment of this application.

FIG. 2 is a schematic flowchart of a method for obtaining a standard configuration template of a network device according to an embodiment of this application. The method may be applied to the network shown in FIG. 1, and the method further includes the following steps.

S201. The computing device 101 obtains configuration commands of a plurality of network devices, and generates a command template set according to the configuration commands of the plurality of network devices.

The plurality of network devices may be, for example, the network device 103, the network device 104, and the network device 105 in FIG. 1. The computing device 101 may obtain the configuration commands on the network devices in various manners. For example, the computing device 101 obtains configuration files on the network devices using the File Transfer Protocol (FTP), and then obtains the configuration commands from the configuration files. For another example, the computing device 101 logs in to the network devices, and directly obtains the configuration commands on the network devices through command exchange. Each configuration command on a network device may be used to configure one function of the network device. Each configuration command may include one or more configuration command lines. FIG. 3 shows examples of three configuration commands. The three configuration commands are separated by symbols "#". The three configuration commands each include two configuration command lines. The separation symbol may alternatively be another symbol. A first configuration command is used to establish a virtual private network (VPN) instance named "_LOCAL_OAM_VPN_", and set the VPN instance, to support an Internet Protocol version 4 (IPv4) address family. A second configuration command is used to establish a VPN instance that is named "_dcn_vpn_" and that is dedicated to a data communication network (DCN), and set the VPN instance, to support an IPv4 address family. A third configuration command has a function similar to that of the first configuration command, and is used to establish a VPN instance named "_LOCAL_OAM_VPN2_", and set the VPN instance, to support an IPv4 address family.

A configuration command includes a command and a parameter. For example, in FIG. 3, "ip vpn-instance ipv4-family" in the first configuration command is a command, and "_LOCAL_OAM_VPN_" is a parameter; "ip dcn vpn-instance ipv4-family" in the second configuration command is a command, and "_dcn_vpn_" is a parameter; and "ip vpn-instance ipv4-family" in the third configuration command is a command, and "_LOCAL_OAM_VPN2_" is a parameter. The computing device 101 may identify the command in the configuration command based on a command dictionary. The command dictionary may be manually set. The computing device 101 obtains a command template after deleting the parameter in the configuration command. Therefore, a command template includes a command in a configuration command. A same command template is obtained after parameters in configuration commands having a same function on network devices are deleted. For example, the first configuration command and the third configuration command shown in FIG. 3 each are used to establish a VPN instance supporting an IPv4 address family, and a difference lies only in that names (namely, parameters) of established VPN instances are different. FIG. 4 shows three command templates obtained after parameters in the three configuration commands in FIG. 3 are deleted. As shown in FIG. 4, after the parameters are deleted, a first command template and a third command template are the same. FIG. 5 shows a command template in another format. In FIG. 5, all content of each configuration command that is obtained after a parameter is deleted is arranged in one row to form a command template. The computing device 101 deletes parameters in the configuration commands obtained from the plurality of network devices, to obtain a plurality of command templates, and obtains different command templates from the plurality of command templates to generate the command template set. When a plurality of command templates are the same, the computing device 101 selects one of the plurality of command templates and adds the command template to the command template set. For example, the first command template and the third command template in the three command templates shown in FIG. 4 are the same, and the command template set generated by the computing device 101 may include the first command template and a second command template. Therefore, the generated command template set includes a plurality of command templates.

S202. The computing device 101 generates a correlation matrix based on the command template set.

The computing device 101 calculates a plurality of correlation values based on the command template set, and generates the correlation matrix using the plurality of correlation values. Each correlation value indicates a correlation between one command template in the command template set and one of the plurality of network devices. The correlation matrix is subsequently used for clustering. It is assumed that the computing device 101 obtains configuration commands from n network devices, and a command template set generated according to the configuration commands includes m command templates. The correlation matrix is an n×m matrix. Each of the n devices corresponds to one row of the matrix, and each of the m different command templates corresponds to one column of the matrix. The correlation value may be calculated using the following formula:

$$w_{ij} = tf_{ij} \times \log \frac{n}{df_j} \times \delta_j.$$

$w_{ij}$ represents a correlation value in an $i^{th}$ and a $j^{th}$ column in the correlation matrix. $tf_{ij}$ represents a quantity of $j^{th}$ command templates in the command template set that are included in an $i^{th}$ network device. $df_j$ represents a quantity of network devices that are in the n network devices and that include the $j^{th}$ command template. $\delta_j$ represents a weight of the $j^{th}$ command template.

Types of command templates may include a typical command template, a general command template, and an interfering command template. A command included in each command template whose type is the typical command template, a command included in each command template whose type is the general command template, and a command included in each command template whose type is the interfering command template may be set. A weight of each type of command template may be set. A weight of the typical command template is greater than a weight of the general command template, and the weight of the general command template is greater than a weight of the interfering command template (for example, the weight of the typical command template is 1, the weight of the general command template is 0.1, and the weight of the interfering command template is 0). The typical command template is a command template that appears only on some common categories of devices, and a category of a device can be relatively easily identified based on the typical command template. The general command template is a command template that appears a relatively large quantity of times on various categories of devices, and it is relatively difficult to identify a category of a device based on the general command template. The interfering command template is a rare command template that occasionally appears. A value of $df_j$ corresponding to the rare command template is apparently less than values of $df_j$ corresponding to the typical command template and the general command template. If a weight of the rare command template is the same as the weight of the general command template, it indicates that a correlation value (namely, an interfering correlation value) of a correlation between the rare command template and a network device on which the rare command template appears is excessively large. Consequently, when clustering is performed using a correlation matrix including the interfering correlation value, the network device including the rare command template is separately categorized into a category, rather than categorized into a common category to which the network device belongs (in other words, the rare command template that occasionally appears interferes with categorization of the network device). Therefore, the weight of the rare command template is set to be less than the weight of the general command template. In the foregoing solution, the weights of the command templates are set (to improve impact of the typical command template and lower impact of the general command template and the interfering command template), so that accuracy and applicability of a clustering result can be improved, and accuracy of network device categorization based on the clustering result can be improved.

To simplify processing, only commands included in command templates whose types are the typical command template and the interfering command template may be set. A command template whose type is neither the typical command template nor the interfering command template is considered as the general command template.

S203. The computing device 101 clusters the plurality of network devices based on the correlation matrix to obtain at least two categories of network devices, and divides the correlation matrix into a plurality of submatrixes based on a clustering result.

The clustering may be performed using an affinity propagation (AP) clustering algorithm, and using the correlation matrix as input. The AP clustering algorithm is an unsupervised clustering algorithm, and a quantity of categories is determined based on a specified categorization threshold. The categorization threshold has a value range from 0 to 1. A smaller categorization threshold indicates fewer categories, and a larger categorization threshold indicates more categories. The plurality of network devices may be categorized into a plurality of categories (at least two categories) through clustering. A command template on a network device reflects a function of the network device, and devices having same or similar functions are categorized into a same category in the clustering. For example, a cell site gateway (CSG) device, an aggregation site gateway (ASG) device, and a radio network controller site gateway (RSG) device are included in an Internet Protocol radio access network (IPRAN). After the devices in the IPRAN are clustered, the CSG device, the ASG device, and the RSG device may be categorized into three categories. For example, a customer edge (CE) device, a provider edge (PE) device, and a provider (P) device are included in a Multiprotocol Label Switching (MPLS) network. After the devices in the MPLS network are clustered, the PE device, the CE device, and the P device may be categorized three categories.

Figure 6A:
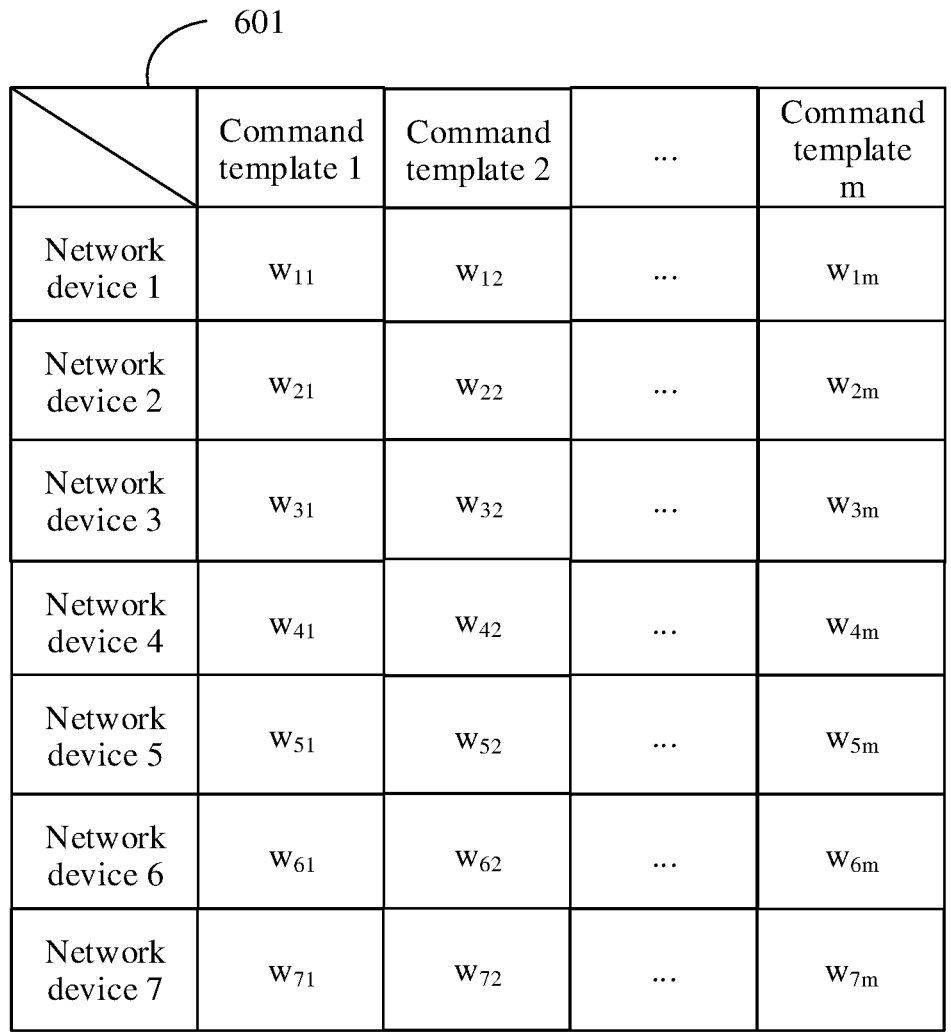
FIG. 6A is a schematic diagram of dividing a correlation matrix according to an embodiment of this application.

The correlation matrix may be divided into the plurality of submatrixes based on the clustering result. Each submatrix corresponds to one of the at least two categories of network devices, and a correlation value in each submatrix indicates a correlation between a command template in the command template set and a network device of the corresponding category. FIG. 6A and FIG. 6B show an example of dividing a 7×m correlation matrix 601 into two submatrixes, for example a 4×m submatrix and a 3×m submatrix. It is assumed that clustering is performed based on the 7×m correlation matrix 601 of seven network devices (a network device 1 to a network device 7 are respectively first to seventh network devices), and the seven network devices totally include m different command templates (in other words, a command template set includes the m different command templates, and a command template 1 to a command template m are respectively first to $m^{th}$ different command templates). Each correlation value in the correlation matrix 601 indicates a correlation between one command template in the command template set and one of the seven network devices (for example, $w_{12}$ indicates a correlation between the command template 2 and the network device 1, and $w_{61}$ indicates a correlation between the command template 1 and the network device 6). The seven network devices are categorized into two categories of devices through the clustering. A first category of devices includes the network device 1, the network device 2, the network device 4, and the network device 5, and a second category of devices includes the network device 3, the network device 6, and the network device 7. Row vectors in the correlation matrix 601 that correspond to the first category of devices form a first submatrix 602, and a correlation value in the first submatrix 602 indicates a correlation between a command template in the command template set (including the command template 1 to the command template m) and a device of the first category (for example, $w_{12}$ indicates a correlation between the command template 2 and the network device 1, and $w_{2m}$ indicates a correlation between the command template m and the network device 2). Row vectors in the correlation matrix 601 that correspond to the second category of devices form a second submatrix 603, and a correlation value in the second submatrix 603 indicates a correlation between a command template in the command template set (the command template 1 to the command template m) and a device of the second category (for example, $w_{61}$ indicates a correlation between the command template 1 and the network device 6, and $w_{72}$ indicates a correlation between the command template 2 and the network device 7).

S204. The computing device 101 performs singular value decomposition (SVD) on each submatrix to obtain a non-zero singular value, and obtains, as a standard configuration template of a category corresponding to each submatrix, a command template that is in the command template set and that makes a contribution greater than a threshold to the non-zero singular value.

A calculation formula of the singular value decomposition is M=UΣV*. M represents a submatrix (for example, the submatrix 602 or the submatrix 603 in FIG. 6B) on which the singular value decomposition is performed. U represents an s×s unitary matrix, and s is a quantity of network devices of a category corresponding to the submatrix M (for example, a quantity of network devices of the first category corresponding to the submatrix 602 in FIG. 6B is 4, and a quantity of network devices of the second category corresponding to the submatrix 603 in FIG. 6B is 3). Σ represents a positive semi-definite s×m rectangular diagonal matrix (the rectangular diagonal matrix indicates that all elements outside a diagonal in the matrix are zero, and an element on the diagonal in the matrix is an element whose row number and column number are the same in the matrix), Σ includes k non-zero singular values that are arranged in descending order along a diagonal starting from a first row, a value of k is equal to a rank of the submatrix M, and all the non-zero singular values in Σ are greater than 0. V* represents an m×m unitary matrix, and V* is a conjugate transpose matrix of V. For example, when singular value decomposition is performed on a 4×5 submatrix, U is a 4×4 unitary matrix, Σ is a positive semi-definite 4×5 rectangular diagonal matrix, and V* is a 5×5 unitary matrix. The k non-zero singular values may be obtained through the singular value decomposition, and k is the rank of the submatrix M.

Each non-zero singular value obtained through the singular value decomposition may be decomposed into m contribution values, and a sum of the m contribution values is equal to the non-zero singular value. Each of m contribution values obtained by decomposing one non-zero singular value corresponds to one command template. Therefore, the contribution value reflects a contribution that is made by the command template to the non-zero singular value. A formula for decomposing each non-zero singular value into m contribution values is shown in the following formula: $\lambda_p = \Sigma_{j=1}^{m} U_p M_j V_{jp}$.

$\lambda_p$ represents a $p^{th}$ non-zero singular value of the non-zero singular values in the matrix Σ that is counted to in descending order. $\Sigma_{j=1}^{m} U_p M_j V_{jp}$ represents a sum of the m contribution values, a first contribution value is $U_p M_1 V_{1p}$, a second contribution value is $U_p M_2 V_{2p}$, and a $j^{th}$ contribution value is $U_p M_j V_{jp}$. $U_p$ represents a $p^{th}$ row vector in the matrix U. $M_j$ represents a $j^{th}$ column vector in the submatrix M (each column vector in the submatrix M corresponds to one command template). $V_{jp}$ represents an element in a $j^{th}$ row and a $p^{th}$ column in the matrix V. Each contribution value above corresponds to one command template, and the $j^{th}$ contribution value $U_p M_j V_{jp}$ corresponds to the $j^{th}$ command template. For example, $\lambda_1$ is equal to a sum of m contribution values $U_1 M_1 V_{11}$, $U_1 M_2 V_{21}$, . . . , and $U_1 M_m V_{m1}$, $U_1 M_1 V_{11}$ corresponds to a first command template, $U_1 M_2 V_{21}$ corresponds to a second command template, and $U_1 M_m V_{m1}$ corresponds to an $m^{th}$ command template.

Based on the foregoing correspondence between a non-zero singular value and a command template, the computing device 101 may measure contribution values corresponding to a same command template in all the non-zero singular values to calculate contributions that are made by each command template to all the non-zero singular values. For example, the contribution is calculated according to the following formula A:

$$\rho_j = \frac{\sum_{p=1}^{k} U_p M_j V_{jp}}{\sum_{p=1}^{k} \lambda_p}.$$

$\rho_j$ represents a contribution of the $j^{th}$ command template in the command template set. $U_p$ represents the $p^{th}$ row vector in the matrix U. $M_j$ represents the $j^{th}$ column vector in the submatrix M. $V_{jp}$ represents the element in the $j^{th}$ row and the $p^{th}$ column in the matrix V. k represents the quantity of the non-zero singular values in Σ. $\lambda_p$ represents the $p^{th}$ singular value in the matrix Σ. A contribution may reflect a typical degree of a command template. A command template with a higher contribution is more suitable to be used as a reference standard for a network device configuration check. In the formula A, $\rho_j$ has a value range of 0 to 1. A same threshold (a value range of the threshold is 0 to 1) may be set for categories corresponding to all the submatrixes, to simply complete threshold setting.

The computing device 101 may alternatively calculate the contribution according to the following formula B (parameters in the formula B have the same meanings as the parameters in the formula A):

$$\rho_j = \sum_{p=1}^{k} \frac{U_p M_j v_{jp}}{\lambda_p}.$$

The computing device 101 compares the contribution with the threshold, and uses, as a standard configuration template of the category corresponding to the submatrix M, a command template that is in the command template set and that makes a contribution greater than the threshold. For example, based on the submatrix 602 in FIG. 6B, a command template that makes a contribution greater than the threshold is used as a standard configuration template of the first category of devices; based on the submatrix 603 in FIG. 6B, a command template that makes a contribution greater than the threshold is used as a standard configuration template of the second category of devices. A value of the threshold is related to a quantity of different command templates on the plurality of network devices (in other words, a quantity of command templates in the command template set). A larger quantity of different command templates indicates a smaller threshold. The threshold may be manually determined. For the first category of devices in FIG. 6B, it is assumed that contributions of the command template 1 and the command template m are greater than the threshold. The command template 1 and the command template m are used as standard configuration templates of the first category of devices. It is assumed that contributions of the command template 2 and the command template m are greater than the threshold. The command template 2 and the command template m are used as standard configuration templates of the second category of devices.

A standard configuration template may be used as a reference standard for a network device configuration check. In the foregoing standard configuration template generation process, a difference between the parameters in the configuration commands is shielded by deleting the parameters such that the clustering can be performed more efficiently, and because the subsequently generated standard configuration template includes no parameter, matching is easier in a configuration check performed based on the standard configuration template, and applicability is better. A standard configuration template is generated for each category, thereby avoiding storing, for each device, a standard configuration used for a configuration check, and reducing storage resource consumption.

The configuration check based on the standard configuration template can be used to replace a configuration check based on a baseline configuration. A baseline is a description of a product attribute that is recognized at a specific time point. In network management, the baseline configuration may be a set of correct configurations that is designed when a network is established and that each device in the network needs to follow. In the configuration check based on the baseline configuration, if it is found that a configuration command of a device is inconsistent with the baseline configuration, it is considered that the device has a configuration risk, and an error prompt is output. However, in the configuration check based on the standard configuration template, a difference between parameters in configuration commands is shielded, thereby avoiding an unnecessary error prompt occurring only because a configuration command has a different parameter. For example, an IP address is reassigned in network device upgrade or network expansion, and a configuration command on a network device for IP address configuration is inconsistent with the baseline configuration. The "inconsistent" is caused only by an IP address (namely, a parameter in the configuration command for IP address configuration) change, and is not a configuration error. In the foregoing case, shielding the parameter "IP address" helps avoid an unnecessary error prompt in a configuration check. In addition, in the configuration check based on the standard configuration template, the standard configuration template is used for matching such that storage resource consumption can be reduced while a configuration check can be implemented.

After obtaining the standard configuration template of each category, the computing device 101 may store the standard configuration template into a local or remote database. For example, when the computing device 101 and the database device 102 are a same device, the standard configuration template is stored into a local database of the computing device 101. For another example, when the computing device 101 and the database device 102 are two separate devices, the standard configuration template is stored into a remote database (namely, a database on the database device 102).

S205. The computing device 101 matches a command template of a to-be-detected network device with a standard configuration template of a category to which the to-be-detected network device belongs, and outputs an error prompt based on a matching result.

The computing device 101 obtains a configuration command of the to-be-detected network device, and generates the command template of the to-be-detected network device according to the configuration command of the to-be-detected network device to perform a configuration check. The to-be-detected device is, for example, a network device newly added to a network (for example, a switch or a router newly added to the network) or an existing network device in the network (for example, the network device 103, the network device 104, or the network device 105 shown in FIG. 1). Through a configuration check on the existing network device in the network, an erroneous configuration change on the existing network device in a network running process can be found. For a manner for obtaining the configuration command of the to-be-detected network device and a manner for generating the command template of the to-be-detected network device, refer to the description in S201. Details are not described herein again. The computing device 101 may obtain the standard configuration template from the local database or the remote database (for example, the database on the database device 102).

The computing device 101 may match the command template of the to-be-detected network device with the standard configuration template of each category, to determine the category to which the to-be-detected network device belongs and the result of matching between the command template of the to-be-detected network device and the standard configuration template of a network device of the category to which the to-be-detected network device belongs. For example, a quantity of command templates that are in all command templates of the to-be-detected network device and that have same content as the standard configuration template of each category is determined as a score of each category. A category having a highest score is the category to which the to-be-detected network device belongs. If a plurality of categories have a same highest score, a category including a smallest quantity of standard configuration templates is the category of the to-be-detected network device. If a plurality of categories have a same highest score and include a same quantity of standard configuration templates, any one of the plurality of categories is selected as the category of the to-be-detected network device. For example, command templates of the to-be-detected network device include A, B, and C, standard configuration templates of a category 1 include A, B, and D, and standard configuration templates of a category 2 include A, B, C, and D. In all the command templates of the to-be-detected network device, A and B can match standard configuration templates A and B of the category 1 (in other words, a score of the category 1 is 2). In all the command templates of the to-be-detected network device, A, B, and C can match standard configuration templates A, B, and C of the category 2 (in other words, a score of the category 2 is 3 and greater than the score of the category 1). Therefore, the category of the to-be-detected network device is the category 2.

When the to-be-detected network device is the existing network device in the network, the computing device 101 may alternatively determine, based on the clustering result in S203, the category to which the to-be-detected network device belongs. When performing S203, the computing device 101 may store, into the local or remote database, the category to which the existing network device belongs. After determining, based on the clustering result in S203, the category to which the to-be-detected network device belongs, the computing device 101 may match the command template of the to-be-detected network device with the standard configuration template of the category to which the to-be-detected network device belongs, to obtain the matching result.

The result of matching between the command template of the to-be-detected network device and the standard configuration template of the category to which the to-be-detected network device belongs includes, for example, a first result where all standard configuration templates of the category to which the to-be-detected network device belongs do not include a standard configuration template that exists in the command template of the to-be-detected network device.

The result of matching between the command template of the to-be-detected network device and the standard configuration template of the category to which the to-be-detected network device belongs includes, for example, a second result where all command templates of the to-be-detected network device do not include a command template that exists in the standard configuration template of the category to which the to-be-detected network device belongs.

The computing device 101 outputs the error prompt based on the matching result. For the first result, content of the error prompt may include that a standard configuration is missing. For the second result, content of the error prompt may include that an erroneous configuration is suspected to occur. The computing device 101 may output the error prompt to a screen, a log, or another device to change the erroneous configuration.

The computing device 101 may be one device, or may be two separate devices. When the computing device 101 is two separate devices, one of the two separate devices may be configured to perform S201 to S204, and the other may be configured to perform S205.

Figure 7:
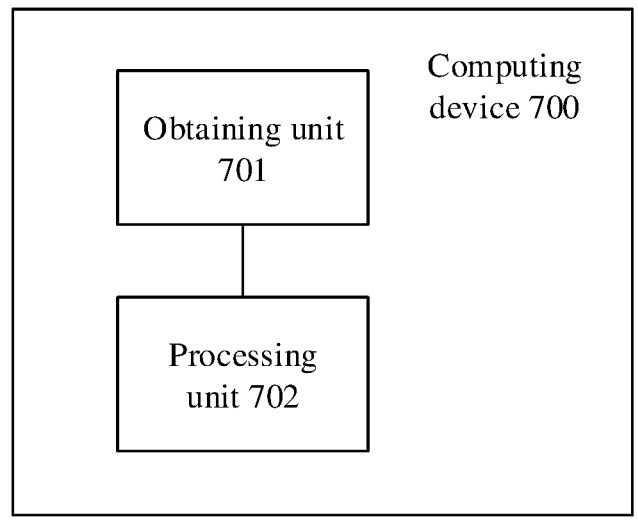
FIG. 7 is a structural diagram of a computing device 700 according to an embodiment of this application.

FIG. 7 is a structural diagram of a computing device 700 according to an embodiment of this application. The computing device 700 may be the computing device 101 in the method shown in FIG. 2. The computing device 700 includes an obtaining unit 701 and a processing unit 702.

The obtaining unit 701 is configured to obtain configuration commands of a plurality of network devices (for example, the network device 103, the network device 104, and the network device 105 in FIG. 1) (for details, refer to the description in S201).

The processing unit 702 is configured to generate a command template set according to the configuration commands of the plurality of network devices, and generate a correlation matrix based on the command template set (for details, refer to the description in S202). The command template set includes a plurality of command templates. The correlation matrix includes a plurality of correlation values, and each correlation value indicates a correlation between one command template in the command template set and one of the plurality of network devices.

The processing unit 702 is further configured to cluster the plurality of network devices based on the correlation matrix to obtain at least two categories of network devices, and divide the correlation matrix into a plurality of submatrixes based on a clustering result (for details, refer to the description in S203). Each submatrix corresponds to one of the at least two categories of network devices. A correlation value in each submatrix indicates a correlation between a command template in the command template set and a network device of the corresponding category.

The processing unit 702 is further configured to perform singular value decomposition on each submatrix to obtain a non-zero singular value, and use, as a standard configuration template of the corresponding category, a command template that is in the command template set and that makes a contribution greater than a threshold to the non-zero singular value (for details, refer to the description in S204).

After obtaining a standard configuration template of each category, the processing unit 702 may store the standard configuration template into a local or remote database (for details, refer to the description in S204).

The obtaining unit 701 may be further configured to obtain a configuration command of a to-be-detected network device (for details, refer to the description in S205). The processing unit 702 may be further configured to generate a command template of the to-be-detected network device according to the configuration command of the to-be-detected network device, match the command template of the to-be-detected network device with a standard configuration template of a category to which the to-be-detected network device belongs, and output an error prompt based on a matching result (for details, refer to the description in S205).

The processing unit 702 may delete parameters in the configuration commands to obtain the plurality of command templates (for details, refer to the description in S201).

The obtaining unit 701 may be one unit, or may be two separate units. When the obtaining unit 701 is two separate units, one of the two separate units may be configured to obtain the configuration commands of the plurality of network devices, and the other may be configured to obtain the configuration command of the to-be-detected network device.

The processing unit 702 may be one unit, or may be two separate units. When the processing unit 702 is two separate units, one of the two separate units may be configured to generate the command template set according to the configuration commands of the plurality of network devices, generate the correlation matrix based on the command template set, cluster the plurality of network devices based on the correlation matrix to obtain the at least two categories of network devices, divide the correlation matrix into the plurality of submatrixes based on the clustering result, perform singular value decomposition on each submatrix to obtain the non-zero singular value, and use, as the standard configuration template of the corresponding category, the command template that is in the command template set and that makes the contribution greater than the threshold to the non-zero singular value, and may store, after obtaining the standard configuration template of each category, the standard configuration template into the local or remote database. The other of the two separate units may be configured to generate the command template of the to-be-detected network device according to the configuration command of the to-be-detected network device, match the command template of the to-be-detected network device with the standard configuration template of the category to which the to-be-detected network device belongs, and output the error prompt based on the matching result. The other of the two separate units may determine, according to the configuration command of the to-be-detected network device and the standard configuration template of each category, the category to which the to-be-detected network device belongs. When the to-be-detected network device is one of the plurality of network devices, the other of the two separate units may determine, based on the clustering result, the category to which the to-be-detected network device belongs.

Figure 8:
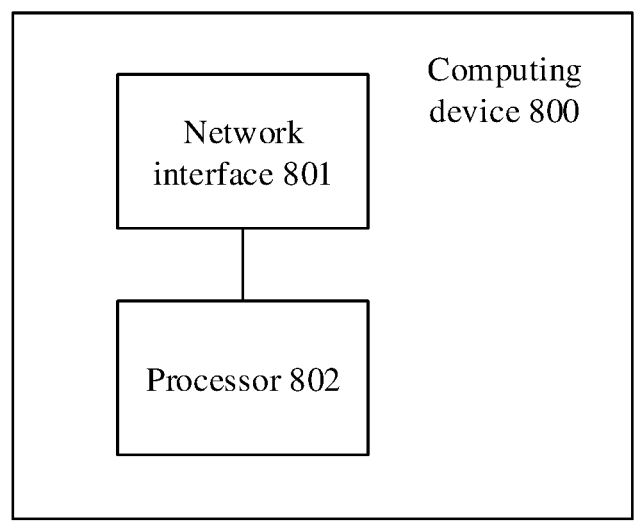
FIG. 8 is a structural diagram of a computing device 800 according to an embodiment of this application.

FIG. 8 is a structural diagram of a computing device 800 according to an embodiment of this application. The computing device 800 may be the computing device 101 in the method shown in FIG. 2. The computing device 800 includes a network interface 801 and a processor 802.

The network interface 801 is configured to obtain configuration commands of a plurality of network devices (for example, the network device 103, the network device 104, and the network device 105 in FIG. 1) (the computing device 800 may be connected to the network devices through the network interface to obtain the configuration commands, and for details, refer to the description in S201).

The processor 802 is configured to generate a command template set according to the configuration commands of the plurality of network devices, and generate a correlation matrix based on the command template set (for details, refer to the description in S202). The command template set includes a plurality of command templates. The correlation matrix includes a plurality of correlation values, and each correlation value indicates a correlation between one command template in the command template set and one of the plurality of network devices.

The processor 802 is further configured to cluster the plurality of network devices based on the correlation matrix to obtain at least two categories of network devices, and divide the correlation matrix into a plurality of submatrixes based on a clustering result (for details, refer to the description in S203). Each submatrix corresponds to one of the at least two categories of network devices. A correlation value in each submatrix indicates a correlation between a command template in the command template set and a network device of the corresponding category.

The processor 802 is further configured to perform singular value decomposition on each submatrix to obtain a non-zero singular value, and use, as a standard configuration template of the corresponding category, a command template that is in the command template set and that makes a contribution greater than a threshold to the non-zero singular value (for details, refer to the description in S204).

The network interface 801 may be a wired communications interface, a wireless communications interface, or a combination thereof. The wired communications interface may be, for example, an Ethernet interface, an asynchronous transfer mode (ATM) interface, or a packet over synchronous digital hierarchy (SDH)/Synchronous optical networking (SONET) (POS) interface. The wireless communications interface may be, for example, a wireless local area network (WLAN) interface, a cellular network communications interface, or a combination thereof.

The processor 802 includes but is not limited to one or more of a central processing unit (CPU), a network processor (NP), an application-specific integrated circuit (ASIC), or a programmable logic device (PLD). The PLD may be a complex programmable logic device (CPLD), a field-programmable gate array (FPGA), generic array logic (GAL), or any combination thereof.

The network interface 801 may communicate with the processor 802 using a bus, or the network interface 801 may be directly connected to the processor 802.

The network interface 801 may be further configured to obtain a configuration command of a to-be-detected network device (for details, refer to the description in S205). The processor 802 may be further configured to generate a command template of the to-be-detected network device according to the configuration command of the to-be-detected network device, match the command template of the to-be-detected network device with a standard configuration template of a category to which the to-be-detected network device belongs, and output an error prompt based on a matching result (for details, refer to the description in S205).

The processor 802 may delete parameters in the configuration commands to obtain the plurality of command templates (for details, refer to the description in S201).

The network interface 801 may be one component, or may be two separate components. When the network interface 801 is two separate components, one of the two separate components may be configured to obtain the configuration commands of the plurality of network devices, and the other may be configured to obtain the configuration command of the to-be-detected network device.

The processor 802 may be one component, or may be two separate components. When the processor 802 is two separate components, one of the two separate components may be configured to: generate the command template set according to the configuration commands of the plurality of network devices, generate the correlation matrix based on the command template set, cluster the plurality of network devices based on the correlation matrix to obtain the at least two categories of network devices, divide the correlation matrix into the plurality of submatrixes based on the clustering result, perform singular value decomposition on each submatrix to obtain the non-zero singular value, and use, as the standard configuration template of the corresponding category, the command template that is in the command template set and that makes the contribution greater than the threshold to the non-zero singular value, and may store, after obtaining the standard configuration template of each category, the standard configuration template into the local or remote database. The other of the two separate components may be configured to: generate the command template of the to-be-detected network device according to the configuration command of the to-be-detected network device, match the command template of the to-be-detected network device with the standard configuration template of the category to which the to-be-detected network device belongs, and output the error prompt based on the matching result. The other of the two separate components may determine, according to the configuration command of the to-be-detected network device and the standard configuration template of each category, the category to which the to-be-detected network device belongs. When the to-be-detected network device is one of the plurality of network devices, the other of the two separate components may determine, based on the clustering result, the category to which the to-be-detected network device belongs.

All or some of the foregoing embodiments may be implemented using software, hardware, firmware, or any combination thereof. When implemented using software, the embodiments may be implemented partially in a form of a computer program product. The computer program product includes one or more computer instructions. When the computer program instruction is loaded and executed on a computer, all or some of the procedures or functions according to the embodiments of the present disclosure are generated. The computer may be a general-purpose computer, a dedicated computer, a computer network, or other programmable apparatuses. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Various parts in this specification are all described in a progressive manner. For same or similar parts in the embodiments, refer to these embodiments. Each embodiment focuses on a difference from other embodiments. Especially, apparatus and system embodiments are basically similar to a method embodiment, and therefore are described briefly. For related parts, refer to partial descriptions in the method embodiment.

It should be understood that, sequence numbers of the foregoing method do not mean particular execution sequences in the embodiments of this application. The execution sequences of the method should be determined based on functions and internal logic of the processes, and should not be construed as any limitation on the implementation processes of the embodiments of this application.

What is claimed is:

1. A method implemented by a computing device for obtaining a standard configuration template of a network device, wherein the method comprises:
   obtaining configuration commands of a plurality of network devices;
   generating a command template set based on the configuration commands of the network devices, wherein the command template set comprises a plurality of command templates;
   generating a correlation matrix based on the command template set, wherein the correlation matrix comprises a plurality of correlation values, and wherein each of the correlation values indicates a correlation between a command template and one of the network devices;
   clustering the network devices based on the correlation matrix to obtain at least two categories of the network devices;
   dividing the correlation matrix into a plurality of submatrices based on a clustering result, wherein each submatrix corresponds to one of at least two of the categories of the network devices, and wherein a correlation value in each submatrix indicates a correlation between a command template in the command template set and a network device of a corresponding category of the network devices;
   performing singular value decomposition on each of the submatrices to obtain a non-zero singular value; and
   using, as a standard configuration template of the corresponding category, a command template in the command template set that makes a contribution greater than a threshold to the non-zero singular value.

2. The method of claim 1, further comprising:
   obtaining a configuration command of a to-be-detected network device,
   generating a command template of the to-be-detected network device according to the configuration command,
   matching the command template of the to-be-detected network device with a standard configuration template that belongs to a category of the to-be-detected network device, and
   outputting an error prompt based on the matching.

3. The method of claim 2, further comprising determining, based on the clustering, a category of a to-be-detected device.

4. The method of claim 2, further comprising deleting parameters in the configuration command to obtain the command template.

5. The method of claim 2, further comprising generating a standard configuration template for each category of at least two of the categories.

6. The method of claim 1, wherein the correlation matrix is an n×m matrix, wherein n is a quantity of the network devices, wherein m is a quantity of the command templates; and wherein a calculation formula of each of the correlation values is:

$$w_{ij} = tf_{ij} \times \log\frac{n}{df_j} \times \delta_j,$$

wherein $w_{ij}$ represents a correlation value in an $i^{th}$ row and a $j^{th}$ column in the correlation matrix, wherein, $tf_{ij}$ represents a quantity of $j^{th}$ command templates in the command template set comprised in an $i^{th}$ network device, wherein $df_j$ represents a quantity of the network devices that comprises a $j^{th}$ command template, and wherein $\delta_j$ represents a weight of the $j^{th}$ command template.

7. The method of claim 1, wherein a calculation formula of the singular value decomposition is:

$$M = U\Sigma V^*,$$

wherein M represents a submatrix on which the singular value decomposition is performed, wherein U represents an s×s unitary matrix, wherein s is a quantity of the network devices of a category that corresponds to the M, wherein $\Sigma$ represents a positive semi-definite s×m rectangular diagonal matrix, wherein non-zero singular values in $\Sigma$ are arranged in descending order along a diagonal starting from a first row, wherein V* represents an m×m unitary matrix and is a conjugate transpose matrix of V, wherein a calculation formula of the contribution is:

$$\rho_j = \frac{\sum_{p=1}^{k} U_p M_j V_{jp}}{\sum_{p=1}^{k} \lambda_p},$$

wherein $\rho_j$ represents a contribution of a $j^{th}$ command template in the command template set, wherein $U_p$ represents a $p^{th}$ row vector in U, wherein $M_j$ represents a $j^{th}$ column vector in M, wherein $V_{jp}$ represents an element in a $j^{th}$ row and a $p^{th}$ column in V, wherein k is a quantity of the non-zero singular values in $\Sigma$, and wherein $\lambda_p$ represents a $p^{th}$ non-zero singular value of the non-zero singular values in $\tau$ that is counted to in descending order.

8. A computing device, wherein the computing device comprises:
    a non-transitory memory storing instructions; and
    a processor coupled to the non-transitory memory and configured to execute the instructions to cause the computing device to be configured to:
        obtain configuration commands of a plurality of network devices;
        generate a command template set based on the configuration commands of the network devices, wherein the command template set comprises a plurality of command templates;
        generate a correlation matrix based on the command template set, wherein the correlation matrix comprises a plurality of correlation values, and wherein each of the correlation values indicates a correlation between a command template and one of the network devices;
        cluster the network devices based on the correlation matrix to obtain at least two categories of the network devices;
        divide the correlation matrix into a plurality of submatrices based on a clustering result, wherein each submatrix corresponds to one of at least two of the categories of the network devices, and wherein a correlation value in each submatrix indicates a correlation between a command template in the command template set and a network device of a corresponding category of the network devices;
        perform singular value decomposition on each of the submatrices to obtain a non-zero singular value; and
        use, as a standard configuration template of the corresponding category, a command template in the command template set that makes a contribution greater than a threshold to the non-zero singular value.

9. The computing device of claim 8, wherein the instructions further cause the computing device to be configured to:
    obtain a configuration command of a to-be-detected network device;
    generate a command template of the to-be-detected network device according to the configuration command;
    match the command template of the to-be-detected network device with a standard configuration template that belongs to a category of the to-be-detected network device; and
    output an error prompt based on the matching.

10. The computing device of claim 9, wherein the instructions further cause the computing device to be configured to determine, based on the cluster of the network devices, a category of a to-be-detected device.

11. The computing device of claim 9, wherein the instructions further cause the computing device to be configured to delete parameters in the configuration command to obtain the command template.

12. The computing device of claim 9, wherein the instructions further cause the computing device to be configured to generate a standard configuration template for each category of at least two of the categories.

13. The computing device of claim 8, wherein the correlation matrix is an n×m matrix, wherein n is a quantity of the network devices, wherein m is a quantity of the command templates, and wherein a calculation formula of each of the correlation values is:

$$w_{ij} = tf_{ij} \times \log \frac{n}{df_j} \times \delta_j,$$

wherein $w_{ij}$ represents a correlation value in an $i^{th}$ row and a $j^{th}$ column in the correlation matrix, wherein $tf_{ij}$ represents a quantity of $j^{th}$ command templates in the command template set comprised in an $i^{th}$ network device, wherein $df_j$ represents a quantity of the network devices that comprise the $j^{th}$ command template, and wherein $\delta_j$ represents a weight of the $j^{th}$ command template.

14. The computing device of claim 8, wherein a calculation formula of the singular value decomposition is:

$$M = U\Sigma V^*,$$

wherein M represents a submatrix on which the singular value decomposition is performed, wherein U represents an s×s unitary matrix, wherein s is a quantity of the network devices of a category that corresponds to the M, wherein E represents a positive semi-definite s×m rectangular diagonal matrix, wherein non-zero singular values in E are arranged in descending order along a diagonal starting from a first row, wherein V* represents an m×m unitary matrix and is a conjugate transpose matrix of V, wherein a calculation formula of the contribution is:

$$\rho_j = \frac{\sum_{p=1}^{k} U_p M_j V_{jp}}{\sum_{p=1}^{k} \lambda_p},$$

wherein $\rho_j$ represents a contribution of a $j^{th}$ command template in the command template set, wherein $U_p$ represents a $p^{th}$ row vector in U, wherein $M_j$ represents a $j^{th}$ column vector in M, wherein $V_{jp}$ represents an element in a $j^{th}$ row and a $p^{th}$ column in V, wherein k is a quantity of the non-zero singular values in $\Sigma$, and wherein $\lambda_p$ represents a $p^{th}$ non-zero singular value of the non-zero singular values in $\Sigma$ that is counted to in descending order.

15. A computing device, comprising:
a network interface configured to obtain configuration commands of a plurality of network devices; and
a processor coupled to the network interface and configured to:
generate a command template set based on the configuration commands of the network devices, wherein the command template set comprises a plurality of command templates;
generate a correlation matrix based on the command template set, wherein the correlation matrix comprises a plurality of correlation values, and wherein each of the correlation values indicates a correlation between a command template and one of the network devices;
cluster the network devices based on the correlation matrix to obtain at least two categories of the network devices;
divide the correlation matrix into a plurality of submatrices based on a clustering result, wherein each submatrix corresponds to one of at least two of the categories of the network devices, and wherein a correlation value in each submatrix indicates a correlation between a command template in the command template set and a network device of a corresponding category of the network devices;
perform singular value decomposition on each of the submatrices to obtain a non-zero singular value; and
use, as a standard configuration template of the corresponding category, a command template in the command template set that makes a contribution greater than a threshold to the non-zero singular value.

16. The computing device of claim 15, wherein the network interface is further configured to obtain a configuration command of a to-be-detected network device, and wherein the instructions further cause the processor to be configured to:
generate a command template of the to-be-detected network device according to the configuration command;
match the command template of the to-be-detected network device with a standard configuration template that belongs to a category of the to-be-detected network device; and
output an error prompt based on the matching.

17. The computing device of claim 16, wherein the instructions further cause the computing device to be configured to determine, based on the cluster of the network devices, a category of a to-be-detected device.

18. The computing device of claim 16, wherein the instructions further cause the computing device to be configured to delete parameters in the configuration command to obtain the command template.

19. The computing device of claim 15, wherein the correlation matrix is an n×m matrix, wherein n is a quantity of the network devices, wherein m is a quantity of the command templates, and wherein a calculation formula of each of the correlation values is:

$$w_{ij} = tf_{ij} \times \log \frac{n}{df_j} \times \delta_j,$$

wherein $w_{ij}$ represents a correlation value in an $i^{th}$ row and a $j^{th}$ column in the correlation matrix, wherein $tf_{ij}$ represents a quantity of $j^{th}$ command templates in the command template set comprised in an $i^{th}$ network device, wherein $df_j$ represents a quantity of the network devices that comprise the quantity of $j^{th}$ command templates, and wherein $\delta_j$ represents a weight of the quantity of $j^{th}$ command templates.

20. The computing device of claim 15, wherein a calculation formula of the singular value decomposition is:

$$M = U\Sigma V^*,$$

wherein M represents a submatrix on which the singular value decomposition is performed, wherein U represents an s×s unitary matrix, wherein s is a quantity of the network devices of a category that corresponds to the M, wherein $\Sigma$ represents a positive semi-definite s×m rectangular diagonal matrix, wherein non-zero singular values in $\Sigma$ are arranged in descending order along a diagonal starting from a first row, wherein $V^*$ represents an m×m unitary matrix and is a conjugate transpose matrix of V, wherein a calculation formula of the contribution is:

$$\rho_j = \frac{\sum_{p=1}^{k} U_p M_j V_{jp}}{\sum_{p=1}^{k} \lambda_p},$$

wherein $\rho_j$ represents a contribution of a $j^{th}$ command template in the command template set, wherein $U_p$ represents a $p^{th}$ row vector in U, wherein $M_j$ represents a $j^{th}$ column vector in M, wherein $V_{jp}$ represents an element in a $j^{th}$ row and a $p^{th}$ column in V, wherein k is a quantity of the non-zero singular values in $\Sigma$, and wherein $\lambda_p$ represents a $p^{th}$ non-zero singular value of the non-zero singular values in $\tau$ that is counted to in descending order.

* * * * *